(12) United States Patent
Rumpel et al.

(10) Patent No.: US 11,092,207 B2
(45) Date of Patent: Aug. 17, 2021

(54) SWITCHABLE BEARING BUSHING FOR A MOTOR VEHICLE

(71) Applicant: SCHAEFFLER TECHNOLOGIES AG & CO. KG, Herzogenaurach (DE)

(72) Inventors: Peter Rumpel, Werneck/Schraudenbach (DE); Hartmut Krehmer, Erlangen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 704 days.

(21) Appl. No.: 15/748,518

(22) PCT Filed: May 17, 2016

(86) PCT No.: PCT/DE2016/200232
§ 371 (c)(1),
(2) Date: Jan. 29, 2018

(87) PCT Pub. No.: WO2017/025085
PCT Pub. Date: Feb. 16, 2017

(65) Prior Publication Data
US 2018/0223937 A1 Aug. 9, 2018

(30) Foreign Application Priority Data
Aug. 13, 2015 (DE) .................. 10 2015 215 425

(51) Int. Cl.
*F16F 1/387* (2006.01)
*B60G 7/00* (2006.01)
(Continued)

(52) U.S. Cl.
CPC ............ *F16F 1/3876* (2013.01); *B60G 7/001* (2013.01); *B60G 7/02* (2013.01); *F16C 11/0609* (2013.01);
(Continued)

(58) Field of Classification Search
CPC ........ B60G 2204/41; B60G 2204/4102; B60G 2204/41042; F16F 1/3876; F16F 1/38;
(Continued)

(56) References Cited

U.S. PATENT DOCUMENTS

| 4,869,476 A * | 9/1989 | Shtarkman | F16F 13/30 267/140.14 |
| 5,887,859 A * | 3/1999 | Hadano | F16F 1/38 267/141.1 |
| 6,237,903 B1 * | 5/2001 | Novak | B60G 7/02 267/141.3 |
| 8,444,163 B2 * | 5/2013 | Fruhmann | B60G 11/12 280/124.175 |

(Continued)

FOREIGN PATENT DOCUMENTS

| CN | 202863058 U | 4/2013 |
| CN | 203604534 U | 5/2014 |

(Continued)

OTHER PUBLICATIONS

International Search Report for International Application No. PCT/DE2016/200232 dated Sep. 6, 2016.

*Primary Examiner* — Jonathan P Masinick
(74) *Attorney, Agent, or Firm* — Dickinson Wright PLLC

(57) ABSTRACT

A bearing bushing for a motor vehicle includes a sleeve, a bolt arranged inside the sleeve, and at least one elastomer element arranged radially between the sleeve and the bolt for supporting the bolt in the sleeve in a damping manner. The bolt has a ball element axially between two distal ends, wherein the ball element interacts with at least two movable ball socket elements in order to change the stiffness of the bearing bushing. This allows the bearing bushing can be switched between at least two stiffness levels.

14 Claims, 1 Drawing Sheet

(51) Int. Cl.
*B60G 7/02* (2006.01)
*F16C 27/00* (2006.01)
*F16C 11/08* (2006.01)
*F16C 27/06* (2006.01)
*F16C 11/06* (2006.01)

(52) U.S. Cl.
CPC .......... *F16C 11/0614* (2013.01); *F16C 11/08* (2013.01); *F16C 11/083* (2013.01); *F16C 27/00* (2013.01); *F16C 27/066* (2013.01); *B60G 2202/42* (2013.01); *B60G 2204/14* (2013.01); *B60G 2204/41* (2013.01); *B60G 2204/4104* (2013.01); *B60G 2204/62* (2013.01); *B60G 2206/11* (2013.01); *F16C 2326/05* (2013.01)

(58) Field of Classification Search
CPC ......... F16F 1/387; F16C 27/00; F16C 27/066; F16C 11/08; F16C 11/083; F16C 11/086
See application file for complete search history.

(56) References Cited

U.S. PATENT DOCUMENTS

| | | | |
|---|---|---|---|
| 9,995,358 B2* | 6/2018 | Powell | B60G 7/003 |
| 10,570,978 B2* | 2/2020 | Rumpel | F16F 1/3876 |
| 10,661,624 B2* | 5/2020 | Andou | B60G 21/026 |
| 10,718,395 B2* | 7/2020 | Krehmer | F16F 3/0876 |
| 10,767,721 B2* | 9/2020 | Zimmerman | F16C 11/0614 |
| 2002/0113349 A1 | 8/2002 | Rivin | |
| 2011/0116731 A1* | 5/2011 | McLaughlin | F16F 1/393 |
| | | | 384/153 |
| 2018/0209478 A1* | 7/2018 | Krehmer | F16F 1/387 |
| 2019/0226543 A1* | 7/2019 | Niwa | F16F 1/387 |

FOREIGN PATENT DOCUMENTS

| | | |
|---|---|---|
| DE | 69622141 T2 | 11/2002 |
| DE | 10155587 C1 | 5/2003 |
| DE | 10211139 A1 | 9/2003 |
| EP | 0784163 A1 | 7/1997 |
| KR | 20080054823 A | 6/2008 |

* cited by examiner

SWITCHABLE BEARING BUSHING FOR A MOTOR VEHICLE

CROSS-REFERENCE TO RELATED APPLICATIONS

This application is the U.S. National Phase of PCT/DE2016/200232 filed May 17, 2016, which claims priority to DE 102015215425.4 filed Aug. 13, 2015, the entire disclosures of which are incorporated by reference herein.

TECHNICAL FIELD

This disclosure relates to a bearing bushing for a motor vehicle, comprising a sleeve, a bolt that is arranged inside the sleeve as well as at least one elastomer element that is arranged radially between the sleeve and the bolt for supporting the bolt in the sleeve in a damping manner, wherein the bearing bushing can be switched between at least two stiffness levels.

BACKGROUND

The structure and the resulting operating data of bearing bushings that are used in a suspension of a motor vehicle have a very strong influence on the driving and steering characteristics of the motor vehicle. Relatively small adjustments of the spring constant or of the stiffness of the bearing bushings could have a significant effect on the driving characteristics such as e.g. the under- or oversteering behavior as well as chassis noises, vibrations and running hardness. Depending on the settings of the bearing bushings, the motor vehicle would display a relatively "soft" or a relatively "hard" running performance.

Different bearing bushings are generally known from the prior art in the field of motor vehicle chassis. For one, mere mechanical bearing bushings or rubber bushings are known, which feature a certain stiffness. In addition to this, hydraulically dampened suspension bushings are known, with a fixed or variable stiffness. Bearings with magnetorheological fluids or magnetorheological elastomers are furthermore known, where the stiffness can be adjusted via a magnetic field.

For example, the DE 696 22 141 T2 discloses a method for the production and application of a suspension bushing with variable-stiffness for controlling the relative movement between a suspension arm in a motor vehicle and a chassis component of the motor vehicle. The suspension bushing features a variable stiffness, which is realized by enclosing a magnetorheological elastomer or gel, whose stiffness can be varied to a wide range by means of a controllable magnetic field. The variable controllable magnetic field is generated by means of an electromagnet structure which is completely integrated as a part of the structure into a suspension bushing structure.

It is the objective of this disclosure to provide a bearing bushing for a motor vehicle, whose stiffness can be adjusted mechanically and which is therefore not based on a hydraulic or magnetorheological operating principle.

SUMMARY

According to an embodiment, a bolt features a ball element that is axially arranged between two distal ends, wherein the ball element interacts with at least two movable ball socket elements in order to adjust the stiffness of the bearing bushing. In other words, a ball element is formed on the bolt. In a first switching position, the bearing bushing is supported by the at least one elastomer element in the sleeve.

On the other hand, the bolt is connected to the sleeve via the at least two ball socket elements in a second switching position of the bearing bushing. Accordingly, the at least one elastomer element is bridged by means of the at least two ball socket elements. In addition, the at least two ball socket elements come into contact with the ball element for increasing the stiffness of the bearing bushing. A load on the bearing bushing guides the force via the bolts and the at least two ball socket elements into the sleeve. Furthermore, a ball joint is realized by the connection between the ball element and the at least two ball socket elements. The stiffness in a second switching position is consequently at its maximum, wherein a tilting of the bolt is made possible.

According to one embodiment, the at least two ball socket elements can be axially moved towards the ball element for the adjustment of the stiffness of the bearing bushing. Thus, the second switching position of the bearing bushing is realized by an axial approaching of the at least two ball socket elements.

According to an embodiment, the at least two ball socket elements can be radially moved towards the ball element for the adjustment of the stiffness of the bearing bushing. Thus, the second switching position of the bearing bushing is realized by a radial approaching of the at least two ball socket elements.

The at least two ball socket elements may be supported on the sleeve in such a way that they are at least movable. For this purpose, an opening may be arranged on the sleeve, which is provided to at least guide the respective ball socket element. However, it is also possible that the at least two ball socket elements are mounted on the outside of the sleeve and are only directed through the sleeve in order to interact with the ball element.

The at least two ball socket elements may be mainly formed in a complementary way to the ball element and that they enclose. In other words, the at least two ball socket elements are adapted to the geometry of the ball element, wherein openings are provided for the bolt axis. But it is furthermore also possible that several ball socket elements accommodate the ball element in a second switching position of the bearing bushing.

Furthermore, one actuator is provided for moving the at least two ball socket elements. Accordingly, the at least two ball socket elements are moved axially or radially by the actuator, whereby the respective stiffness level of the bearing bushing is initiated. The actuator may include an electric motor as well as a control element for controlling and regulating the stiffness of the bearing bushing.

This disclosure includes the technical teaching that the ball element is arranged axially between two elastomer elements. The two elastomer elements may be made in a ring-shaped design, wherein the bolt is axially guided through the two elastomer elements and is thus radially mounted on the sleeve by means of the two elastomer elements. The at least two ball socket elements are arranged axially between the two elastomer elements.

BRIEF DESCRIPTION OF THE DRAWINGS

Further measures for improvement are described in further detail in the following along with the description of embodiments of the disclosure shown in the figures. It is shown:

FIG. 3b is a further schematic cross-sectional depiction to illustrate the structure of the bearing bushing according to FIG. 3a.

DETAILED DESCRIPTION OF THE DRAWINGS

Figure 1:
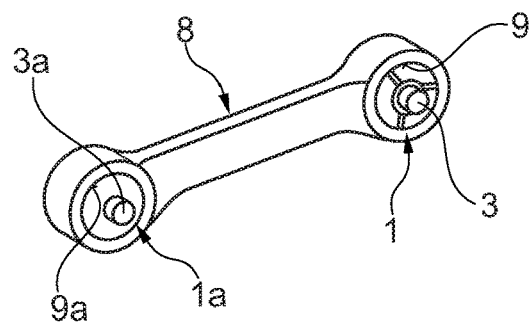
FIG. 1 is a perspective view of a suspension arm for a motor vehicle, wherein the suspension arm comprises a bearing bushing according to one embodiment.

According to FIG. 1, a bearing bushing 1 is arranged within a bore hole 9, that is intended for that purpose, at a suspension arm 8. The suspension arm 8 is built into a—not depicted—suspension of a—not depicted—motor vehicle. A—not depicted—axle carrier of a motor vehicle will be attached to a bolt 3 of the bearing bushing 1. The suspension arm 8 furthermore comprises an additional bore hole 9a, into which a mechanical, non-switchable bearing bushing 1a is arranged. In other words, bearing bushing 1a is designed as a conventional rubber bearing. A—not depicted—wheel carrier is attached to a bolt 3a of the bearing bushing 1a.

Figure 2A:
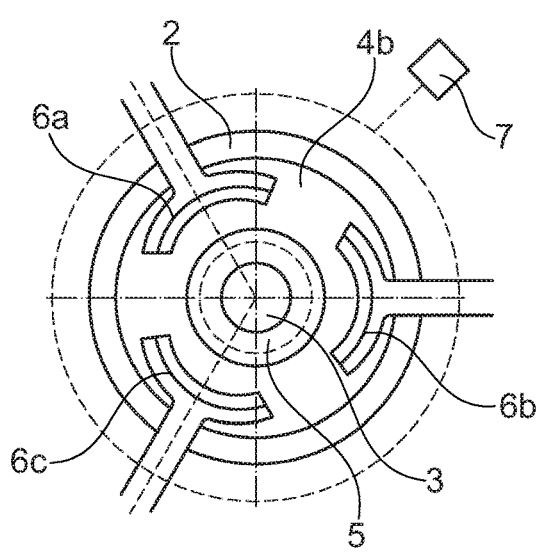
FIG. 2a is a schematic sectional depiction to illustrate the structure of the bearing bushing according to a first embodiment.
Figure 2B:
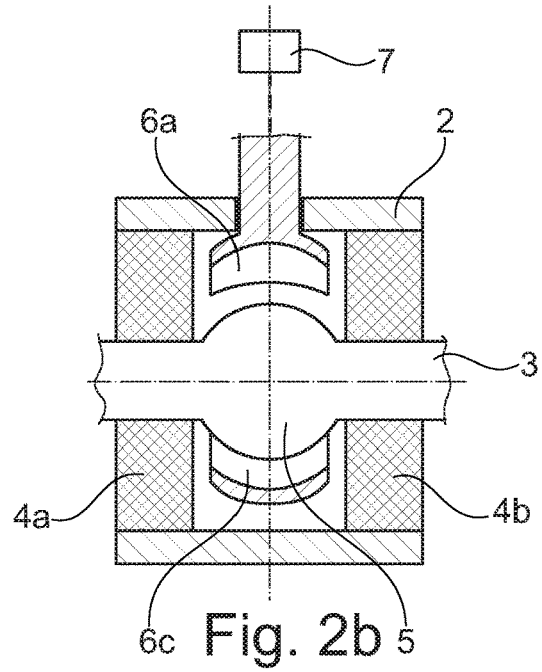
FIG. 2b is a further schematic cross-sectional depiction to illustrate the structure of the bearing bushing according to FIG. 2a, FIG. 3a is a schematic sectional depiction to illustrate the structure of the bearing bushing according to a second embodiment.

According to the FIGS. 2a and 2b, the bearing bushing 1 according to one embodiment features a sleeve 2 and a bolt 3 which is arranged within the sleeve 2. Furthermore, two elastomer elements 4a, 4b are arranged radially between sleeve 2 and bolt 3 for a dampened bearing of bolt 3 within sleeve 2. Bolt 3 features a ball element 5 that is axially arranged between two distal ends, wherein ball element 5 interacts with three movable ball socket elements 6a-6c in order to adjust the stiffness of the bearing bushing 1. The ball element 5 is consequently arranged axially between two elastomer elements 4a, 4b.

In the first switching position shown, bearing bushing 1 according to one embodiment features a minimum stiffness. This is the case since bolt 3 is connected via the two elastomer elements 4a, 4b to sleeve 2 in a dampened manner. A radial approaching of the ball socket elements 6a-6c leads to an increase of the stiffness of bearing bushing 1 in a second switching position (not shown). This is the case because the two elastomer elements 4a, 4b are bridged by means of the three ball socket elements 6a-6c in the second switching position and a force that is introduced into bolt 3 is thus lead via the three ball socket elements 6a-6c into sleeve 2 without any dampening. Accordingly, the bearing bushing 1 can be switched between two stiffness levels. The ball socket elements 6a-6c are mounted at sleeve 2 in such a way that they can be moved in radial direction. For this purpose, an actuator 7 is connected to the ball socket elements 6a-6c. The ball socket elements 6a-6c are furthermore formed as a complement to ball element 5 and enclose ball element 5.

Figure 3A:
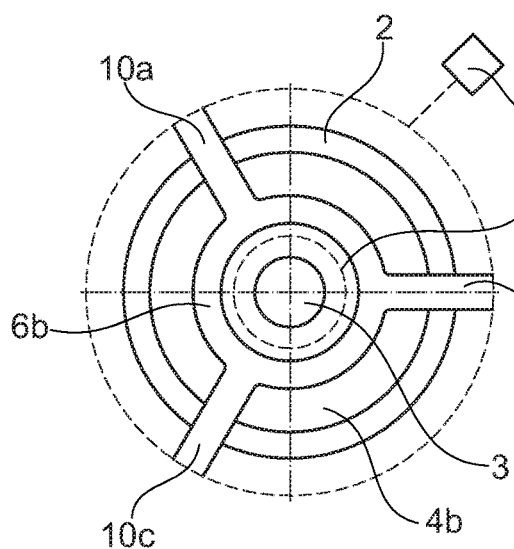
Figure 3B:
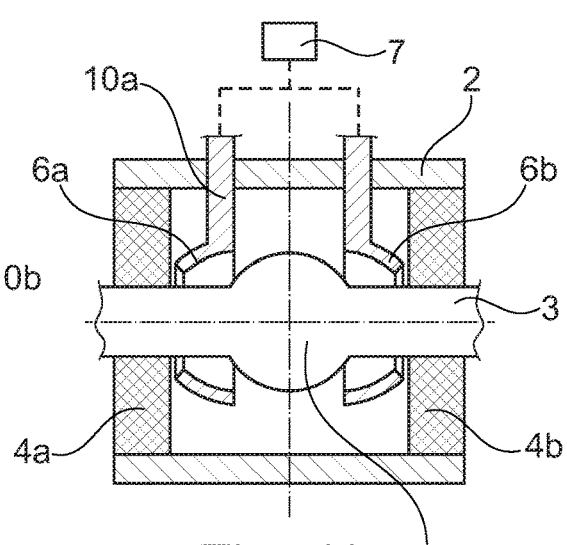

According to the FIGS. 3a and 3b, the bearing bushing 1 features a sleeve 2 and a bolt 3 which is arranged within the sleeve 2. Furthermore, two elastomer elements 4a, 4b are arranged radially between sleeve 2 and bolt 3 for a dampened bearing of bolt 3 within sleeve 2. Bolt 3 features a ball element 5 that is axially arranged between two distal ends, wherein ball element 5 interacts with two axially movable ball socket elements 6a, 6b in order to adjust the stiffness of bearing bushing 1. The two ball socket elements 6a, 6b are thus basically separated in two halves and feature three radial elements 10a-10c for a homogeneous force distribution, which are designed in a star-shaped formation. An actuator 7 is connected to the two ball socket elements 6a, 6b for the axial adjustment. The ball socket elements 6a, 6b are furthermore formed as a complement to ball element 5 and enclose ball element 5.

LIST OF REFERENCE SIGNS 1, 1a Bearing bushing
2 Sleeve
3, 3a Bolt
4a, 4b Elastomer element
5 Ball element
6a-6c Ball socket element
7 Actuator
8 Suspension arm
9, 9a Bore hole
10a-10c Radial element

The invention claimed is:

1. A bearing bushing for a motor vehicle, comprising:
a sleeve;
a bolt arranged inside the sleeve; and
at least one elastomer element arranged radially between the sleeve and the bolt for supporting the bolt in the sleeve in a damping manner, wherein the bearing bushing can be switched between at least two stiffness levels;
wherein the bolt includes a ball element axially arranged between two distal ends, wherein the ball element interacts with at least two axially movable ball socket elements in order to switch between the stiffness levels of the bearing bushing.

2. The bearing bushing according to claim 1, wherein the at least two ball socket elements can be axially moved towards the ball element for the switch between the stiffness levels of the bearing bushing.

3. The bearing bushing according to claim 1, wherein the at least two ball socket elements are supported on the sleeve in such a way that they are movable.

4. The bearing bushing according to claim 1, wherein the at least two ball socket elements are formed in a complementary way to the ball element and that they enclose the ball element.

5. The bearing bushing according to claim 1, further comprising an actuator to move the at least two ball socket elements.

6. The bearing bushing according to claim 1, wherein the ball element is arranged axially between two elastomer elements.

7. A bearing bushing for a vehicle, comprising:
a sleeve;
a bolt inside the sleeve, the bolt having a ball region defining a radius;
an elastomer arranged radially between the sleeve and the bolt for supporting the bolt in the sleeve while providing dampening between the bolt and the sleeve; and
at least one ball socket moveable in a radial direction toward the ball region and shaped to conform to the ball region, wherein the at least one ball socket is configured to apply a force on the ball region to change a stiffness of the bearing bushing.

8. The bearing bushing of claim 7, wherein the at least one ball socket includes three ball sockets spaced circumferentially about the ball region.

9. The bearing bushing of claim 7, further comprising an actuator coupled to the at least one ball socket and configured to force the ball socket in the radial direction.

10. The bearing bushing of claim 7, wherein the ball socket is an integral part of a ball socket element that extends through the sleeve.

11. The bearing of claim 7, wherein the elastomer is a first elastomer and the bearing bushing further comprises a second elastomer spaced apart from the first elastomer and on an opposite side of the ball region.

12. The bearing of claim 11, wherein the first and second elastomers define a space therebetween in which the ball region is located.

13. The bearing bushing of claim 7, wherein the ball socket is an integral part of a split ball socket element with two halves, each half coupled to an actuator configured to force the halves in the radial direction.

14. A bearing bushing for a vehicle, comprising:
a sleeve;
a pair of elastomer members spaced apart from one another and located radially inward from the sleeve;
a bolt extending through the elastomer members and along an axis, the bolt having a first outer diameter, the bolt having a ball region with a second outer diameter exceeding the first outer diameter; and
a plurality of ball socket elements extending through the sleeve and located axially between the pair of elastomer members, the ball socket elements moveable radially toward the ball region such that a radial force provided from the ball socket elements onto the ball region alters a stiffness of the bearing bushing.

* * * * *